May 5, 1964 H. I. WILEY, JR., ETAL 3,132,238
WELDING METHOD
Filed Sept. 26, 1958 2 Sheets-Sheet 1
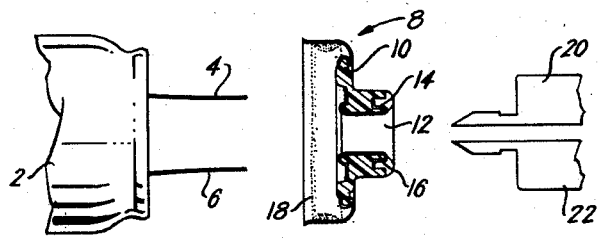
Fig_1
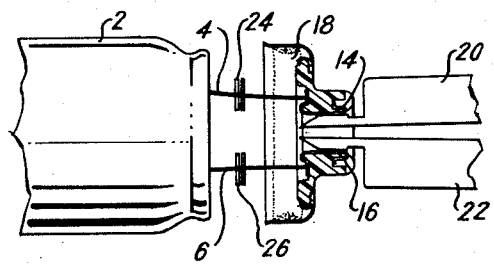
Fig_2
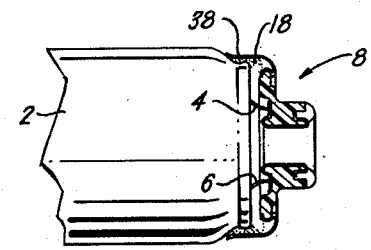
Fig_4
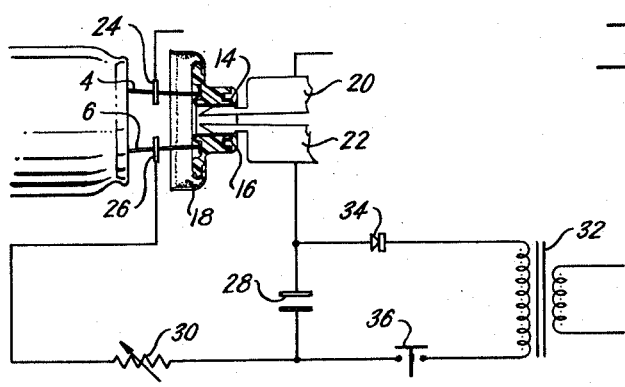
Fig_3
INVENTORS
HAROLD I. WILEY, JR.
STANLEY C. SHAPPELL
BY
ATTORNEY

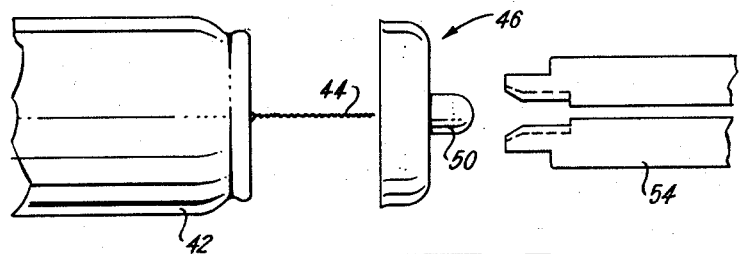
Fig_5
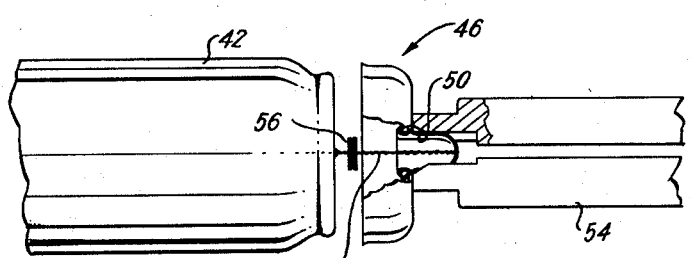
Fig_6
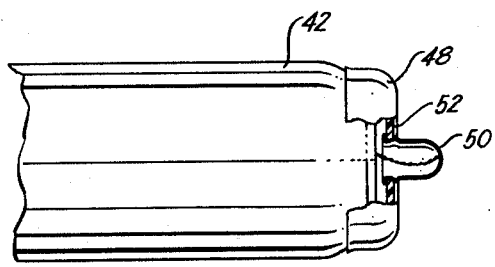
Fig_7

United States Patent Office 3,132,238
Patented May 5, 1964

3,132,238
WELDING METHOD
Harold I. Wiley, Jr., Danvers, and Stanley C. Shappell, West Boxford, Mass., assignors, by mesne assignments, to Sylvania Electric Products Inc., Wilmington, Del., a corporation of Delaware
Filed Sept. 26, 1958, Ser. No. 763,509
2 Claims. (Cl. 219—117)

This invention relates to the manufacture of electrical devices, and more particularly to the manufacture of electrical devices having lead-in wires extending therefrom and connected to electrical contact members in bases or caps with which the electrical devices are provided.

In the manufacture of electric lamps, electronic tubes and the like, lead-in wires extending from the lamp or tube envelope are electrically connected to suitable contact members disposed in a base or cap with which the envelope is provided, thereby providing means through which electrical energy may be transmitted to filaments, electrodes and the like within the envelope. Considerable effort has been exerted over the years, in the manufacture of electric lamps and electronic tubes, to insure the attainment of a good electrical connection initially and the maintenance thereof during the life of the article.

Generally speaking, three different means have been employed, in various applications, to establish this electrical connection. They are crimping, soldering and welding. Crimping is usually effected by pinching a base pin through which a lead-in wire extends to obtain a mechanical joining of the lead-in wire to the pin. Soldering is usually effected by the application of a quantity of solder to the tip of a base pin within which a lead-in wire is disposed, the lead-in wire extending into the tip to be joined thereto by the solder. Welding is usually effected by the application of a welding electrode to the external surface of the tip of a base pin within which a lead-in wire is disposed, the lead-in wire extending into the tip to be joined thereto upon energization of the welding electrode. Each of these means is characterized by certain advantages. Unfortunately, there are also disadvantages associated therewith.

With respect to crimping, particularly when a rolled or seamed pin is used, there is the tendency and danger of the seam opening up upon the application of the crimping force. A crimped pin, of course, leaves much to be desired from an appearance viewpoint. Because of the deformation necessarily involved in crimping, there is always the danger of an accidental catching of the deformed portion of the pin in certain types of lampholders or sockets which, many times, are not made by the manufacturer of the based article.

When solder is used, care must be exercised to insure close control over both the quantity and quality thereof. Too little solder or solder of poor quality may result in a poor electrical connection. Too much solder may also cause an abnormal and undesirable increase in the overall length of the base pins and/or a poor electrical connection. In addition to these considerations, there is always the problem of poor electrical connections which develop during the use of the lamp due to corrosion of the solder and/or corrosive effects of flux which may be present on the pins.

When a welding tool is applied to the tip of a base pin to secure thereto the lead-in wire extending into the aperture provided therefor in the tip of the pin, the heat generated during this welding operation melts the tip of the pin to such an extent that the pin is somewhat shorter after welding than it is before welding. To compensate for this, and to try to obtain pins of uniform length in the finished product, it has been suggested that initially the pins be made longer than desired in the finished product and rigid controls be exercised during the welding operation to make sure that each pin is shortened to the same extent. In addition to this pin tip problem, welded pin tips are often dirty and of irregular contour, thus detracting considerably from the appearance of the lamp.

In view of the foregoing, an object of this invention is to provide a new method of establishing an electrical connection between a lead-in wire extending from an electrical device and the electrical contact member of a base with which the electrical device is provided.

A feature of the method of this invention is the freedom from the aforementioned deficiencies and disadvantages which characterizes articles processed by the method of this invention.

These and other objects, advantages and features are attained, in accordance with the principles of our invention, by welding the lead-in wire extending from an electrical device to the electrical contact member of a base interiorly thereof. The electrical device with the lead-in wire extending therefrom, and the base having an electrical contact member are advanced toward one another. During at least a portion of this relative movement of the electrical device with respect to the base, one electrode of a welding circuit is connected ot the lead-in wire of the electrical device and the other electrode of the welding circuit is connected to the electrical contact member of the base. When the lead-in wire of the electrical device and the electrical contact member of the base touch one another, the electrical circuit through the aforementioned welding electrodes is closed thereby, thus permitting the condenser in the welding circuit to discharge and effect a welding of the lead-in wire to the contact member.

In the specific embodiments of our invention illustrated in the accompanying drawings, FIGURE 1 is a fragmentary, elevational view, partly in section, showing an initial relative disposition of a fluorescent lamp having a pair of lead-in wires extending substantially parallel therefrom, a lamp base of the recessed, double contact type, and a pair of welding electrodes.

FIGURE 2 is a fragmentary, elevational view, partly in section, showing the relative disposition of the lamp, the base and the welding electrodes of FIGURE 1 after the aforementioned welding electrodes have been brought into engagement with the electrical contact strips disposed within the insulating member of the base, another pair of welding electrodes have been brought into engagement with the lead-in wires, and the lead-in wires of the lamp have touched the inner ends of these electrical contact strips.

FIGURE 3 is a view similar to FIGURE 2, on a smaller scale, and also includes a schematic diagram of welding circuit, the welding electrodes connected to the lead-in wires also being shown schematically.

FIGURE 4 is a fragmentary detail, partly in section, of the end of fluorescent lamp based in accordance with the method of our invention.

FIGURE 5 is a fragmentary, elevational view, partly in section, showing an initial relative disposition of a fluorescent lamp having a pair of lead-in wires extending therefrom and helically twisted to define in effect a composite wire, a lamp base of the single pin type, and a bifurcated welding electrode.

FIGURE 6 is a fragmentary, elevational view, partly in section, showing the relative disposition of the lamp, the base and the welding electrode of FIGURE 5 after the aforementioned welding electrode has been brought into engagement with the base pin, another welding electrode has been brought into engagement with the composite wire, and the composite wire has touched the inner surface of the base pin.

FIGURE 7 is a fragmentary detail, partly in section, of a fluorescent lamp based in accordance with the method of our invention.

The fluorescent lamp, a fragmentary portion of which is shown in FIGURE 1, is one of the conventional commercial types, i.e., it comprises a hermetically sealed envelope 2, having a filamentary electrode disposed at each end thereof and supported by a pair of lead-in wires 4 and 6 extending therefrom. The base 8 is of the type shown and described in the co-pending application of S. C. Shappell and R. B. Thomas, Serial Number 637,196, filed January 30, 1957, now Patent No. 2,995,723, and assigned to the same assignee as this application. The base 8 comprises a body member 10 of insulating material provided with a central aperture 12 extending therethrough, a pair of spaced, metal, electrical contact strips 14 and 16 disposed within said aperture 12, and an annular metal shell 18 within which the body member 10 is secured.

In effecting a welding of the lead-in wires 4 and 6 to the inner ends of the contact strips 14 and 16 respectively, the lamp envelope 2, with the lead-in wires 4 and 6 projecting substantially parallel therefrom, and the base 8 are disposed in axial alignment susbtantially as shown in FIGURE 1, and a pair of welding electrodes 20 and 22, insulated from one another, are advanced into the aperture 12 in the base body member 10 and into engagement with contact strips 14 and 16 respectively. A pair of welding electrodes 24 and 26, insulated from one another, are advanced into engagement with the lead-in wires 4 and 6 respectively intermediate the ends thereof, substantially as shown in FIGURE 2, and relative movement is effected between the lamp envelope 2 on the one hand, and the base 8 and the welding electrodes 20 and 22 disposed therein on the other hand, to cause the ends of the lead-in wires 4 and 6 to touch the inner ends of the contact strips 14 and 16 respectively. Engagement of the inner ends of the contact strips 14 and 16 by the ends of the lead-in wires 4 and 6 respectively, closes a pair of separate welding circuits through the welding electrodes 20 and 24 on the one hand and 22 and 26 on the other hand, to thereby effect a welding of the lead-in wires to the contact strips in the base.

A welding circuit associated with lead-in wire 6 and contact strip 16 is shown schematically in FIGURE 3. A similar welding circuit, not shown, is associated with lead-in wire 4 and contact strip 14. The circuit comprises a condenser 28, one side of which is connected to welding electrode 22, which is in engagement with contact strip 16 in base 8. The other side of the condenser 28 is connected through rheostat 30 to welding electrode 26 which is in engagement with lead-in wire 6 extending from the lamp envelope 2. This particular welding circuit is illustrative only of one form of welding circuit which may be employed. The means shown for recharging the condenser 28 after each welding operation is similar in nature. The particular re-charging means, shown for illustrative purposes, comprises a transformer 32 and a rectifier 34. The rectifier 34 is connected in series with the secondary winding of the transformer 32 and a pair of relay contacts 36 is in the same series loop. The contacts 36 are normally closed and are opened just prior to the discharge of the condenser. The transformer primary is connected to a suitable source of electrical energy.

The welding electrodes 20 and 24 are connected to a circuit similar to the one just described to effect a welding of lead-in wire 4 to contact strip 14.

After the lead-in wires 4 and 6 have been welded to the inner ends of the contact strips 14 and 16 respectively, the electrodes 20 and 22, and 24 and 26 are withdrawn and further relative movement between the base 8 and the lamp envelope 2 is effected to seat the base on the end of the lamp envelope as shown in FIGURE 4. The base shell 18 may be provided with a ring of cement of the type usually employed to secure the shell to the rim of the lamp envelope. Since the lead-in wires 4 and 6 are longer initially (as shown in FIG. 1 for example) than the length thereof required in a based lamp, care must be exercised in seating the base 8 on the end of the lamp envelope 2 after welding to make sure that the lead-in wires 4 and 6 do not engage one another or the base shell 18 because if they do an electrical short circuit during operation will result. This may be done in any one or more of several ways. The lead-in wires 4 and 6 may be made shorter initially than heretofore, they may be pre-formed in a manner which will insure buckling in a pre-determined direction, and the base may be rotated as it is moved into seating engagement with the end of the lamp envelope to displace the lead-in wires further away from one another.

In the embodiment shown in FIGURES 5-7, an instant-start type of fluorescent lamp employing a single pin base is illustrated. In this embodiment, a filamentary electrode sealed within the lamp envelope 42 is supported therein by a pair of lead-in wires extending therefrom, these lead-in wires being helically twisted to define a composite wire 44. The base 46 comprises an annular metal shell 48 and a pin 50 disposed in a body member 52 of insulating material (FIG. 7).

In effecting a welding of the composite wire 44 to the inner face of the base pin 50, the lamp envelope 42, with the composite wire 44 extending axially from the end thereof and the base 46 in axial alignment therewith are disposed substantially as shown in FIGURE 5 and a bifurcated welding electrode 54, a fragmentary portion of which is shown, is moved into engagement with the outer face of the base pin 50. A welding electrode 56 is advanced into engagement with the composite wire 44 intermediate the ends thereof, substantially as shown in FIGURE 6, and relative movement is effected between the lamp envelope 42 on the one hand and the base 46 and the welding electrode 54 on the other hand, to cause the end of the composite wire 44 to touch the inner face of the base pin 50. Engagement of the inner face of the base pin 50 by the end of the composite wire 44 closes a welding circuit, similar to the one in FIGURE 3, through the welding electrodes 54 and 56 to thereby effect a welding of the composite wire 44 to the inner face of the base pin 50.

After the composite wire 44 has been welded to the inner face of the base pin 50, the welding electrodes 54 and 56 are withdrawn and further relative movement between the base 46 and the lamp envelope 42 is effected to seat the base on the end of the lamp envelope as shown in FIGURE 7.

Another type of fluorescent lamp base, with which the method of this invention may be employed, is the bi-pin base shown and described in the co-pending application of S. C. Shappell and R. B. Thomas, filed on even date herewith, and assigned to the same assignee as this application.

Although the specific embodiments of the method of this invention have been shown and described in connection with the manufacture of fluorescent lamps, it will be readily appreciated by those skilled in the art that the welding method may be applied in the manufacture of other types of electric lamps, such as the bottom contact of an incandescent lamp for example, electronic tubes and the like.

What we claim is:

1. The method of providing an electrical energy translating device having a lead-in wire extending therefrom with a base having an electrical contact member, said method comprising: positioning said device in proximity to said base with the free end of said lead-in wire near but spaced from an inner surface of said contact member; advancing one electrode of a welding circuit into engagement with said lead-in wire intermediate the ends thereof and between said device and said base, and another electrode of said welding circuit into engagement with said contact member; effecting relative movement between said device and said base to cause said lead-in wire to touch the inner surface of said contact member, thereby effecting a welding of the said free end of said lead-in wire to the said inner surface of said contact member; retracting said one electrode from engagement with said lead-in wire intermediate the ends thereof and from between said base; and then effecting further relative movement between said device and said base to position said base on said device.

2. The method of providing an electric lamp having a lead-in wire extending therefrom with a base having an electrical contact member, said method comprising: positioning said lamp in proximity to said base with the free end of said lead-in wire near but spaced from an inner surface of said contact member; advancing one electrode of a welding circuit into engagement with said lead-in wire intermediate the ends thereof and between said lamp and said base, and another electrode of said welding circuit into engagement with said contact member; effecting relative movement between said lamp and said base to cause said lead-in wire to touch the inner surface of said contact member, thereby effecting a welding of the said free end of said lead-in wire to the said inner surface of said contact member; retracting said one electrode from engagement with said lead-in wire intermediate the ends thereof and from between said lamp and said base; and then effecting further relative movement between said lamp and said base to position said base on said lamp.

References Cited in the file of this patent
UNITED STATES PATENTS

| | | |
|---|---|---|
| 1,900,100 | Fitzpatrick | Mar. 7, 1933 |
| 2,017,647 | Betts | Oct. 15, 1935 |
| 2,279,316 | Herzog | Apr. 14, 1942 |
| 2,309,973 | Miller | Feb. 2, 1943 |
| 2,566,318 | Dalin et al. | Sept. 4, 1951 |
| 2,832,883 | Bechard | Apr. 29, 1958 |